INVENTORS
FIROUZ SHAHROKHI
HERMAN T. CLARK

BY *Cameron, Kerkam & Sutton*

ATTORNEYS

INVENTORS
FIROUZ SHAHROKHI
HERMAN T. CLARK

BY Cameron, Kerkam & Sutton

ATTORNEYS

United States Patent Office 3,531,210
Patented Sept. 29, 1970

3,531,210
APPARATUS FOR MONITORING SURFACE DEGRADATION AND MEASURING SURFACE REFLECTANCE OF MATERIAL UNDERGOING PHOTON BOMBARDMENT BY OBSERVING THE TORQUE ON THE SAMPLE
Firouz Shahrokhi and Herman T. Clark, Tullahoma, Tenn., assignors to The University of Tennessee Research Corporation, Knoxville, Tenn., a corporation of Tennessee
Filed Apr. 8, 1968, Ser. No. 719,305
Int. Cl. G01j 1/56; G01n 21/48
U.S. Cl. 356—209                                      10 Claims

ABSTRACT OF THE DISCLOSURE

A mechanical-optical device capable of optical, mechanical or electrical readout of deflection angles of surface deflections of irradiated samples is provided. Samples of test materials are carried on the torque arm of a suspension system and are mounted within an evacuated chamber where the materials are irradiated by a monochromatic photon source of a desired frequency and intensity. Changes in position of the torque arm due to forces exerted on the materials by the photons are monitored, and a torquing crank is provided to continually adjust the torque arm to its balanced position after time zero, while the materials are irradiated.

BACKGROUND OF THE INVENTION

Because of continuous technological advances being made, particularly in the area of space exploration, there is a continuous demand for new and better materials. Efficient use of new materials demands knowledge of their physical properties. Two important physical properties of materials for which data is frequently required are surface reflectance and surface degradation due to solar irradiation.

When photons, such as visible light, are incident on a surface, they exert a force on the surface of the material. Some of the photons are absorbed by the surface, while some are reflected. The reflected photons exert an additional force on the surface of the material and the total force exerted on a surface is equal to the change in momentum of the incident and leaving photons. The change in momentum of the incident and leaving photons is dependent on the arriving directions of the incident photons, the reflected directions of the leaving photons and the number of photons reflected. Thus, the number of reflected photons and their directional distribution are representative of the optical properties of the surface of the material and the refractive index of the medium in which the surface of the material is contained, and a measurement of the forces exerted by the photons can be used to provide a measurement of the physical characteristics of the material undergoing photon bombardment.

SUMMARY OF THE INVENTION

In accordance with the present invention, there is provided a mechanical-optical system which is sensitive to forces exerted by incident photon energy on a specimen undergoing irradiation. A torque arm and torsion suspension system provides means by which deflections caused by such forces can be measured and changes in the forces with time are continuously monitored while the surface of the specimen undergoing irradiation is continuously bombarded with photons of a desired frequency and intensity.

Accordingly, it is a primary object of the present invention to provide a novel and an improved apparatus for investigation of physical characteristics of materials.

Another object of the present invention is to provide a novel and an improved apparatus for monitoring of surface degradation of materials.

Another object of the present invention is to provide a novel and improved apparatus for monitoring of surface reflectance of materials.

Yet another object of the present invention is to provide a novel and improved apparatus for continuous monitoring of surface degradation of a material undergoing irradiation and for measuring surface reflectance of a material undergoing irradiation.

These and other objects of the present invention and the attendant advantages will be readily apparent from the following detailed description thereof taken in connection with the accompanying drawings wherein like characters represent like parts throughout the several views.

Figure 1:
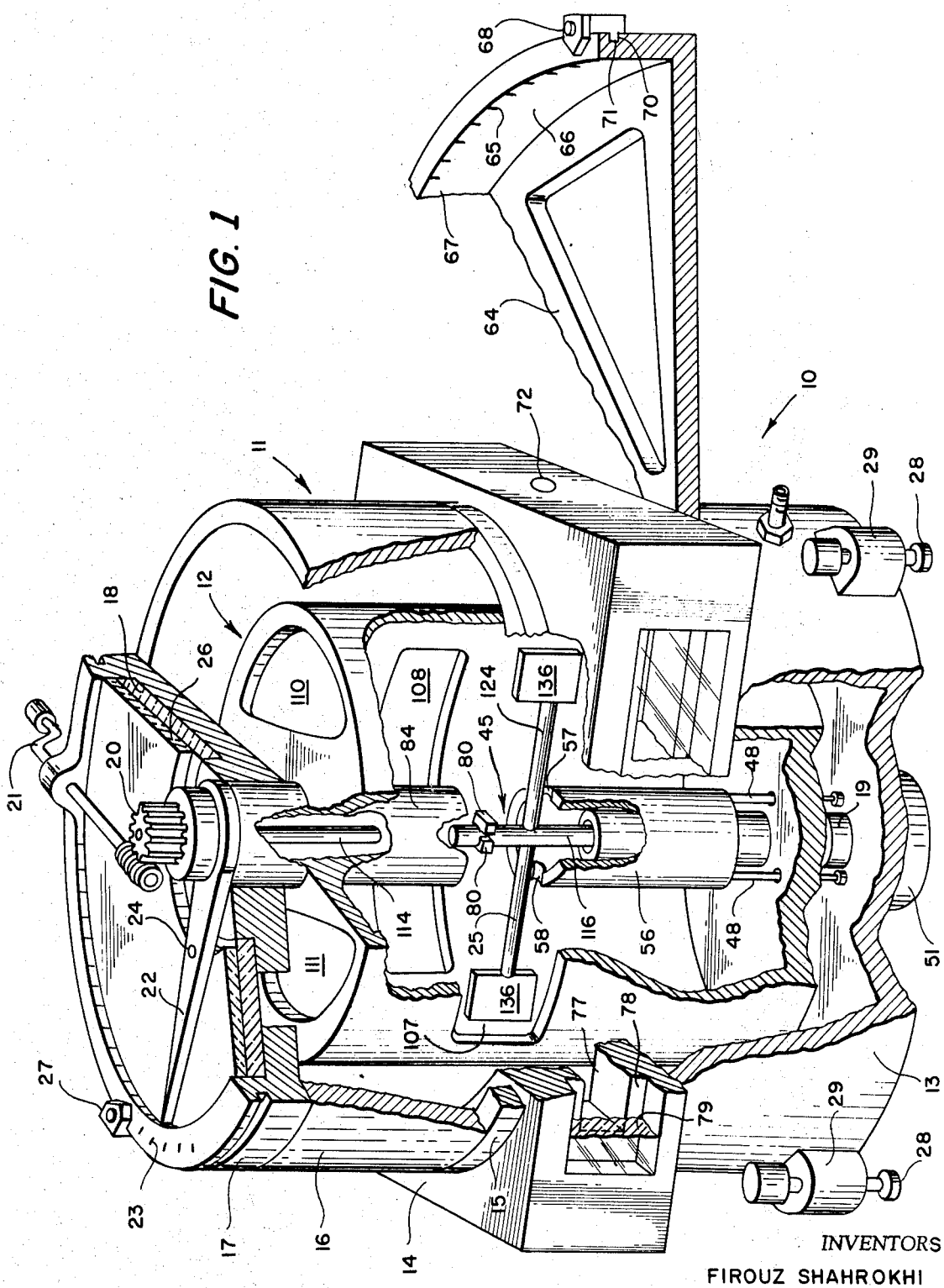
FIG. 1 is a fragmentary, perspective elevational view of the present invention with a number of parting planes, minor components and vacuum seals omitted for clarity.
Figure 2:
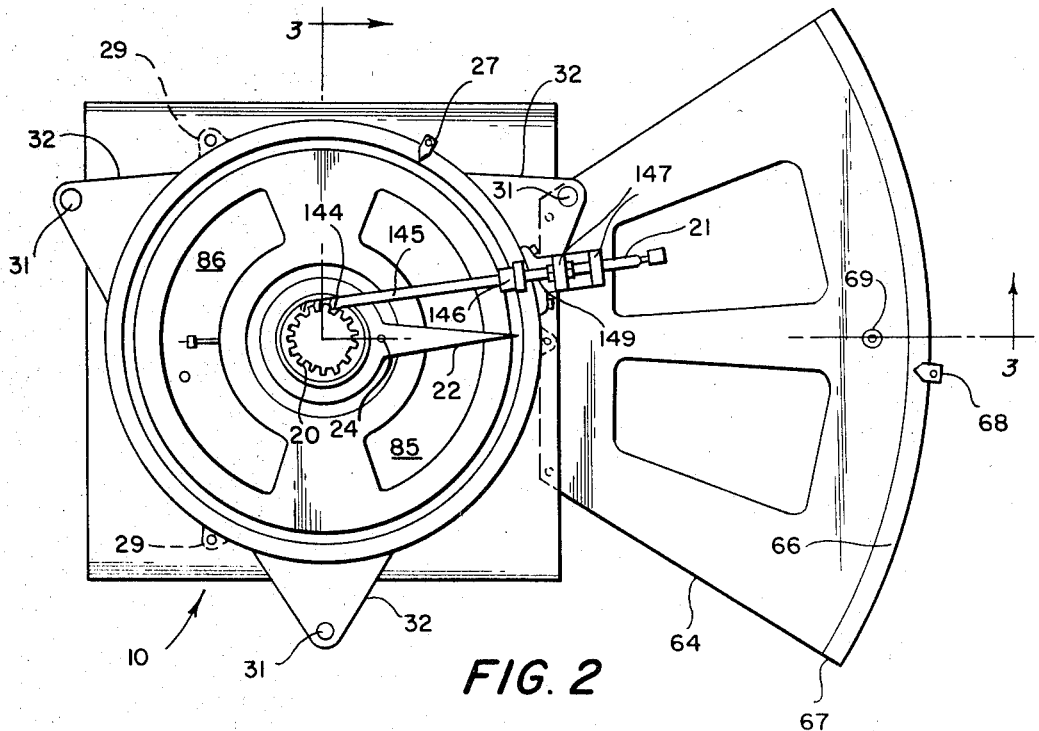
FIG. 2 is a plan view of the apparatus of the present invention.
Figure 3:
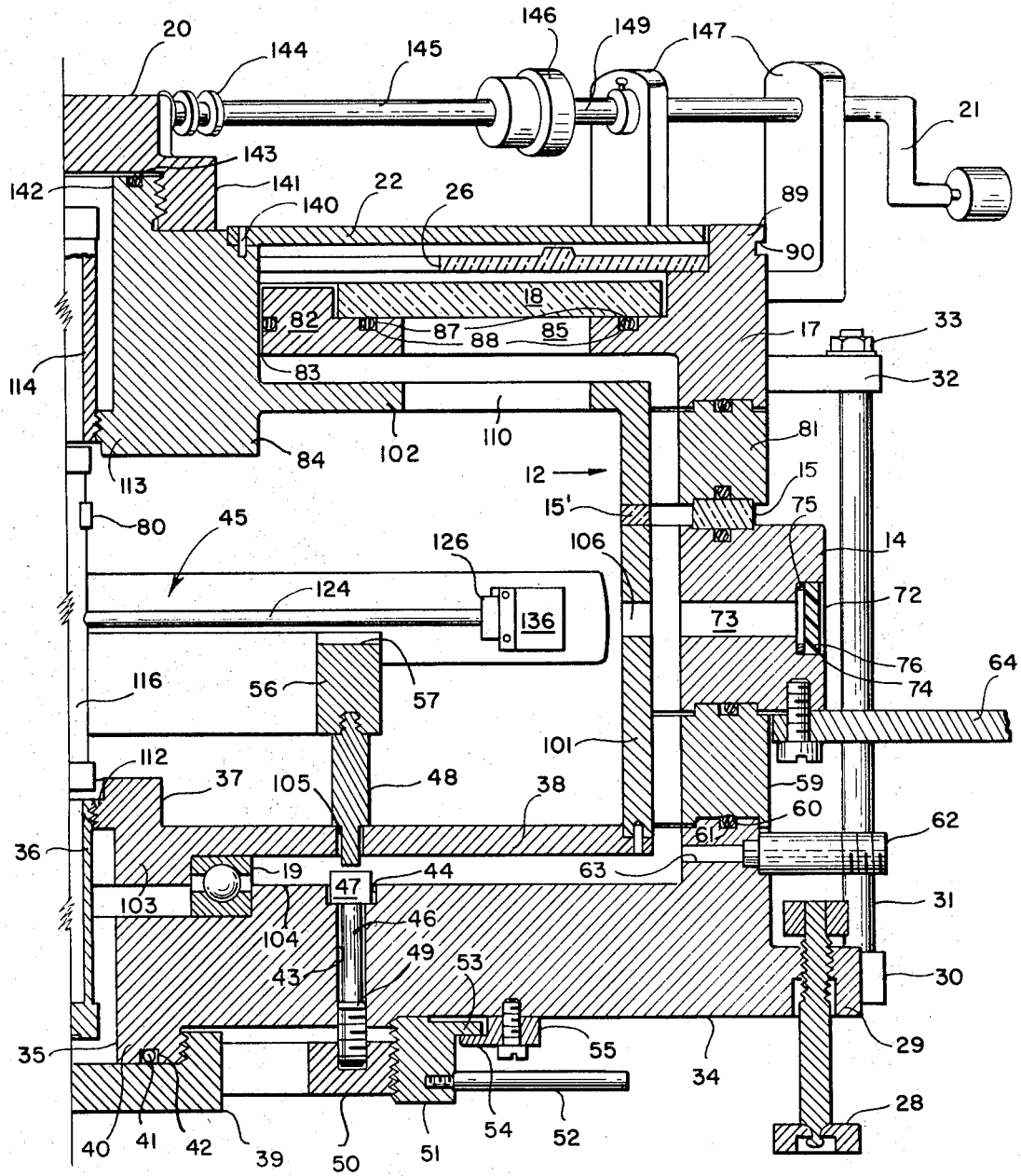
FIG. 3 is a cross-sectional, elevational view of the apparatus taken along lines 3—3 of FIG. 2 with the angular position scale indicator broken away.

Referring now to the drawings and in particular to FIGS. 1–3, reference numeral 10 indicates generally the mechanical-optical apparatus of the present invention for effecting surface deflection measurements of photon irradiated samples. For purposes of simplification and clarity, a number of parting planes, minor components, vacuum seals, and other minor structural details which would be obvious to one skilled in the art have been omitted from FIGS. 1 and 2, but the details of construction will be readily apparent from FIG. 3 and the following detailed description.

Generally, apparatus 10 includes an outer shell 11 and a coaxial inner shell 12. The outer shell is made up of seven major components. As viewed in FIG. 1, these components are a lower ring 13, a rectangular housing 14 having windows transparent to photon radiation, a ring viewing window 15 for transmitting the inward and outward light rays of the optical reflection system, an upper ring 16, a cover plate 17 and an overhead viewing glass 18.

The inner shell supports the dynamic components of the assembly and is rotatable with respect to the outer shell 11. To this end, the inner shell is supported within the outer shell and in spaced relationship therewith by a centrally located ring bearing 19. A worm gear 20 secured to the uppermost, central columnar portion of the inner shell is disposed for cooperative engagement with a manually operable inner shell torquing crank 21. An indicator 22 fixed with respect to the inner shell 12 and mounted to the columnar portion establishes the relative position of the inner shell with respect to the outer shell by means of a visible scale 23 on cover plate 17. Optical alignment sight 24 on indicator 22 permits adjustment of the indicator with respect to the torque arm 25 so as to permit compensation for background radiation during a measuring condition. A hand rotatable plexiglass position indicator 26 having a visual sighting hair (not shown) is also provided to establish the equilibrium position of the torque arm 25 carrying the samples undergoing irradiation. One or more sliding indicators or markers 27 are provided on the outer shell to mark positions on the scale 23. The torque arm 25 and its associated components comprising the balance of the dynamic components are supported within the inner shell 12 as will be hereinafter described.

The outer shell assembly is shown in greater detail in FIG. 3. Lower ring 13 is provided with three foot pads 28 adjustably threaded into corresponding extensions 29 spaced from each other 120° about the shell. Three further extensions 30 are spaced about the lower ring. Each further extension 30 supports a vertical column bolt 31 which passes through a corresponding extension 32 on the upper ring 16. Nut 33 is threaded tightly to draw the several parts of the outer shell together in sealing engagement.

Lower ring 13 includes a base plate 34 having a central bore 35 within which is received the lower end of the torsion wire suspension retainer 36, the upper end of which is secured to the lower inner support 37 on the base plate 38 of inner shell 12. Closure cap 39 threaded over the central base extension 40 seals the unit by means of a conventional O ring 41 positioned in annular channel 42.

Base plate 34 is provided with a plurality of bores 43 which extend from the outside surface of the base plate to an annular channel 44 on the inside surface. Preferably, three bores are provided and each receives an axially slidable actuating pin 46 of the torque arm support assembly 45. Each pin 46 has an enlarged head portion 47 at one end adapted for cooperation with the bottom surface of an axially aligned upper actuating pin 48 which extends through base plate 38 of the inner shell 12. Each pin 46 is axially movable within its bore and includes a sealing ring 49 disposed about the columnar portion thereof to maintain a vacuum within the main assembly.

The lower end of each lower actuation pin 46 is secured to inner actuation ring 50. Inner ring 50 is cooperatively threaded into an outer actuation ring 51 which may be provided with one or more handles 52 to facilitate turning thereof. The upper end of ring 51, as viewed in the drawing, is provided with an annular flange extension 53 supported on the bearing surface 54 of retention ring 55 screwed into base plate 34. It should be apparent that as the outer ring 51 is turned, the inner ring 50 will be caused to approach or move further away from the base plate 34, depending on the direction of turning movement of the outer ring. The motion of ring 50 in the axial direction will be transmitted through the actuating pins 46 and 48 to the torque arm support ring 56 mounted on the ends of upper actuating pins 48. Ring 56 includes a pair of notches or grooves 57 and 58 which serve as seat members and which are adapted to receive the torque arm 25 when the ring 56 is in its raised or actuated position. As shown in FIG. 3, the torque arm support ring 56 is in its deactuated position.

Advantageously, lower ring 13 may be of unitary construction or fabricated of separate sections as shown in FIG. 3 wherein the lower ring comprises a separate base plate 34 and a separate ring spacer 59 which forms a portion of the outer wall. The adjacent surfaces of the ring-like elements are fabricated such that one surface is channeled while the other surface is provided with an annular ridge received in the channel. One or the other of the surfaces is provided with a groove 60 within which is received sealing ring 61 of the O ring type. Other conventional sealing arrangements may be provided between the mating surfaces. A conventional connector 62 is mounted in ring 13 so that the interior of the apparatus may be evacuated by connection to suitable vacuum apparatus through passage 63.

The rectangular housing 14 is disposed above the lower ring 13 and an optical scale attachment 64 having an angular position scale 65 on the internal surface 66 of wall 67 is mounted to housing 14 in a conventional manner. Wall 67 extends at a right angle to the horizontal member of attachment 64 and position indicator 68 slidably mounted on the wall is used to mark a position on the scale. To this end, indicator 68 includes a tongue 70 disposed in channel 71 in the external surface of wall 67. An adjustable outer leveling screw 69 disposed near the extremity of the attachment 64 serves to maintain the attachment level with respect to the horizontal axis of torque arm 25.

Torque arm 25 may be visually checked for level through a pair of diametrically opposed optical viewing ports 72, only one of which is shown. Each port 72 comprises a cylindrical channel 73 which extends through the wall of the housing 14 and which terminates in a larger cylindrical opening 74. Opening 74 receives a sealing ring 75 and an optically transparent plastic window 76.

Housing 14 also includes a pair of diametrically opposed irradiation ports 77, only one of which is shown. As can be seen most clearly in FIG. 1, ports 77 are rectangular in shape and terminate at a larger opening to provide a shoulder or ledge 78. A window 79 which is transparent to the source of radiation and which may be held in place by means of retention tabs or clamps (not shown) conveniently fastened to the outside of the housing is mounted in the larger opening.

Disposed above housing 14 is an annular optical deflection viewing window 15. Window 15 is in horizontal alignment with a pair of optical deflection mirrors 80 carried on the torsion wire suspension assembly. Above windows 107 and 108 is disposed a similar optical deflection viewing window 15.

Above window 15 is upper ring 16, which may either be of unitary construction or formed of separate elements such as spacer 81 and cover plate 17, shown in FIG. 3. Cover plate 17 includes a radially inward extending portion 82 having a central bore 83 through which the cylindrical column or central barrel portion 84 of the inner shell 12 extends. Cover plate 17 also includes a pair of arcuate shaped ports 85 and 86 which permit removal of samples and overhead viewing.

Disposed above the viewing ports on the top surface of radially extending portion 82 is an overhead annular viewing glass or ring 18. Conventional O ring seals 87 in cover plate channels 88 seal the juncture of ring 18 and surface 82. The outer portion of cover plate 17 is raised at 89 to provide a surface on which visible angular position scale 23 is marked. Annular channel 90 disposed on an outside surface of the cover plate 17 is adapted to receive an inwardly extending tongue or projection (not shown) of marker 27 which may be adjustably positioned about the scale.

Inner shell assembly 12 includes a base plate portion 38, side wall section 101, and cover section 102. The central portions of base plate 38 and cover 102 terminate in barrel-like extensions 37 and 84 which provide a lower inner ring support and an upper inner ring support, respectively. Shell 12 is rotatable relative to the outer shell 11 by means of inner ring bearing 19 disposed in a channel or raceway formed by spaced but adjacent, annular surfaces 103 and 104 of adjacent base sections 38 and 34, respectively.

Three bores 105 (only one of which is shown) are provided in base plate 38. Bores 105 are adapted to be coaxially aligned with lower actuating pin receiving bores 43. Each bore 105 slidingly receives the reduced body portion of upper actuating pin 48 which extends through the bore for engagement with the lower actuating pin 46. The opposite end of each upper actuating pin 48 is secured to annular torque arm support ring 56 which in its non-actuative position is disposed below the horizontal axis of the torque arm 25. Notches 57 in ring 56 are spaced 180° with respect to each other and adapted when ring 56 is in its actuated position to receive and support torque arm 25 so as to reduce handling loads on the suspension system during sample installation and removal or laboratory movement of apparatus 10.

Cylindrical side wall 101 has a pair of optical deflection viewing ports 106 (only one of which is shown) and a pair of irradiation ports 107 and 108 adapted to be aligned with the viewing ports and irradiation ports of the outer shell assembly 12. Likewise, cover 102 of the inner shell assembly includes sample removal and viewing ports 110 and 111 adapted to be aligned with the sample removal and viewing ports of the outer shell assembly.

The torque arm and torsion suspension system is contained and supported by inner shell 12. To this end, barrel sections 37 and 84 include internally threaded ring support flanges 112 and 113. Lower torsion wire suspension retainer 36 is carried at one end by support 112, while the upper torsion wire suspension retainer 114 is carried by support 113. The other ends of retainers 36 and 114 are capped to anchor the torsion suspension wire or filament 115 which passes through suspension tube 116.

Figure 4:
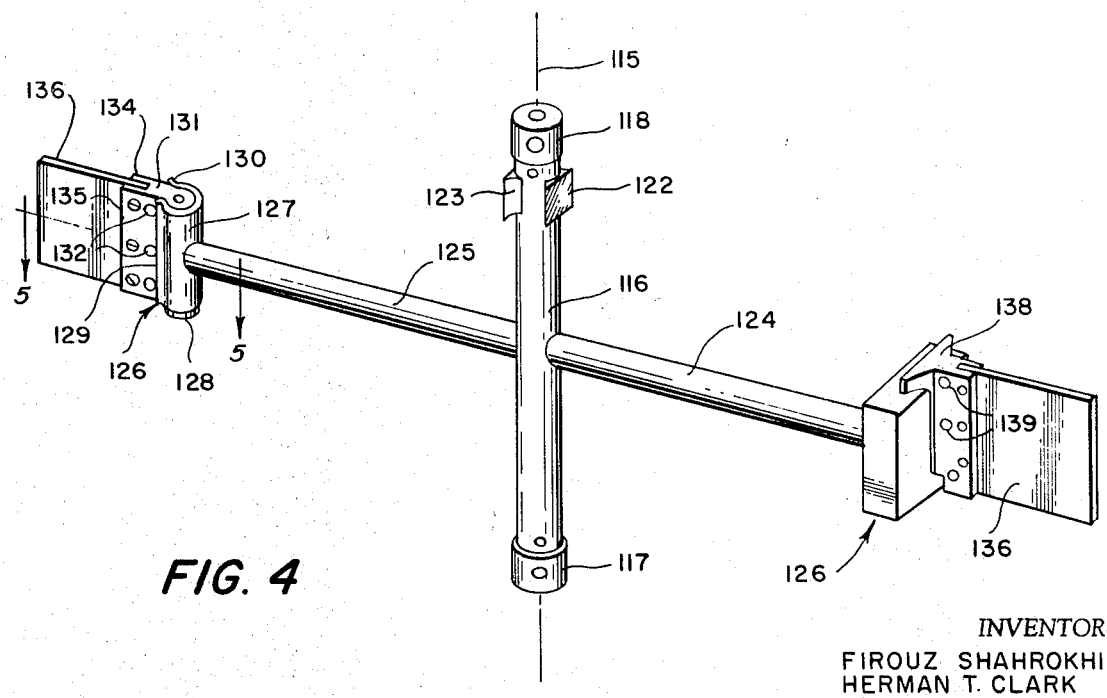
FIG. 4 is a perspective view of the torque arm arrangement.
Figure 6:
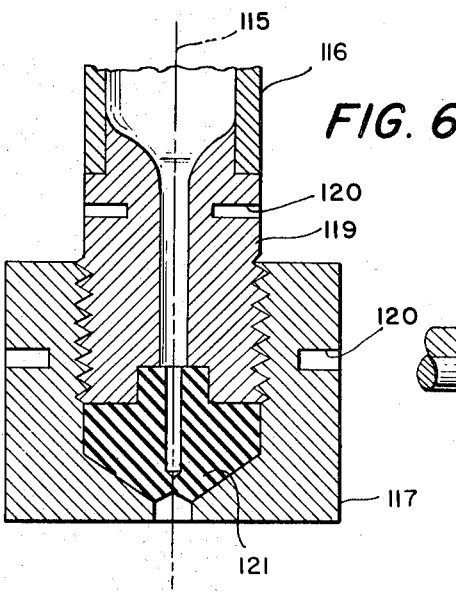
FIG. 6 is a fragmentary, elevational view, partly in cross section, of the end of the suspension tube and illustrating the details of the suspension wire retention cup.

Suspension tube 116 includes a pair of retention clamps 117 and 118 at opposite ends thereof, as shown most clearly in FIGS. 4 and 6, to fix the torque arm system with respect to the suspension filament. Each clamp is identical and comprises a cap member which is interally threaded and adapted to receive a suspension tube tip 119, which may be soldered or brazed to the end of the suspension tube. Torquing holes 120 in the tip 119 and retention cap or clamp 117 are provided for receiving the tool required to torque the caps and deform grommet 121. Grommet 121 may be a malleable metal or a paste and is disposed between the end of tip 119 and cap 117 to anchor wire 115. The grommet is deformed as the cap is screwed and insures adequate contact area for prevention of slippage due to forces caused by weight of the torque arm and induced torque due to irradiation. It can be appreciated that because of the fragile nature of thin filaments, a secure attachment of the filament is critical to proper performance of the apparatus.

Supported to the outer surface of the suspension tube 116 and in alignment with the optical deflection viewing ports 72 and 106 are a pair of mirrors 122 and 123. Below mirrors 122 and 123 torque arms 124 and 125 extend at right angles from the suspension tube. Each torque arm supports at its extremity a test surface holder 126.

Figure 5:
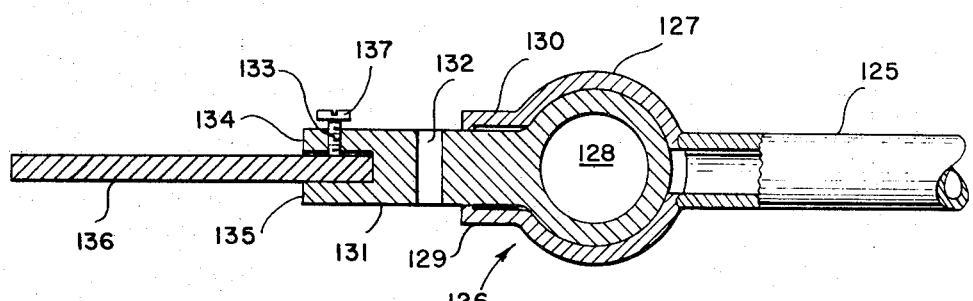
FIG. 5 is a cross-sectional, plan view, taken along lines 5—5 of FIG. 4 of the preferred embodiment of the specimen support.

A preferred embodiment of the test surface holder 126 is shown affixed to arm 125 of the torque arm system illustrated in FIG. 4, and shown in greater detail in FIG. 5. Holder 126 is of the key hole type and includes a substantially cylindrical section 127 having a bottom plate 128 to close off one end. The barrel portion of section 127 is open along the axial dimension and two spaced extensions 129 and 130 are adapted to receive therebetween test surface clamp 131. Clamp 131 is inserted from the open top end of holder 126 and between extensions 129 and 130 and may be removed therefrom by one or more access holes 132 provided for insertion of suitable gripping means. Threaded holes 133 are provided in one or both of spaced retention arms 134 and 135 for holding test surface 136 in place by means of screws 137.

Another form of a test surface holder is illustrated on arm 124. In this embodiment, holder 126 is provided with a channel having inwardly tapered surfaces and test surface clamp 138 has complementary surfaces, with the taper gradually decreasing in the outward direction. Thus the holder is also of the key hole type and clamp 138 is inserted into the slot from the top. The manner of retaining the test surface is identical with that previously described and access holes 132 permit ready removal thereof from the apparatus 10. Obviously, other forms of retainers will suggest themselves to those skilled in the art.

The interior of inner shell 12 is sealed at the top by an internally threaded cap 141 which is disposed on the externally threaded extension 142 of barrel section 84. Extension 142 includes on its top surface a suitable annular flange within which is received O ring 143. A worm gear 20 secured to cap 141 or formed integral therewith cooperates with gear 144 carried on one end of shaft 145 to effect rotation of the inner shell. The other end of shaft 145 is cooperatively connected to shaft 149 of crank 21 through shaft disconnect coupling 146. Shaft 149 is rotatably carried in bearing pillars 147 mounted to outer shell 11.

Figure 7:
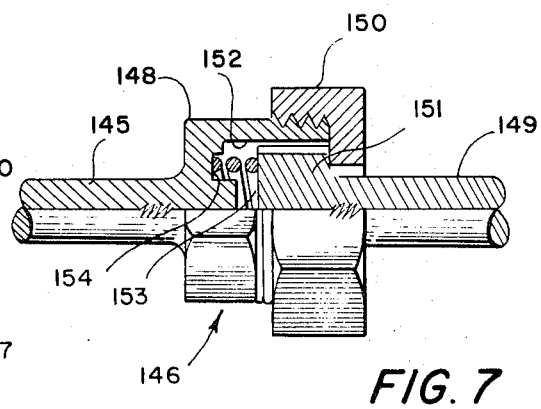
FIG. 7 is a fragmentary, elevational view, partly in cross section, illustrating the shaft disconnect coupling.

Referring to FIG. 7, it will be seen that shaft disconnect 146 comprises an internally threaded head member 150 slidably carried on shaft 149 and adapted to be threaded to the externally threaded head 148 of shaft 145. Head 148 includes internal gear teeth 152 which cooperate with spline 151 formed on the end of shaft 149. Head 148 also is provided with an internal annular channel 153 which seats one end of compression spring 154. The other end of compression spring 154 bears against the flat surface of spline 151.

It should be apparent from the foregoing description that torque arm 25 carrying the test surfaces and the overhead viewing ports of the inner and outer shells 12 and 11 may be aligned to permit removal of a test surface and its retention clamp mounted in holder 126. To effect this removal, actuating handle 52 is rotated so that lower actuation pin 46 and upper actuation pin 48 rise to cause torque arm support ring 56 to engage torque arm 25. The inner shell torquing worm screw 144 and shaft 145 are removed by disassembling shaft disconnect 146. The manually rotatable torque arm position indicator 26 and inner ring position indicator 22 are removed. Both of the latter elements can be removed by lifting them from position. The last element to be removed to gain access to the interior is the overhead viewing glass 18 which may be removed by using suction cups. Direct access can now be had to the test surfaces. A special hand tool (not shown) is inserted into the access holes 132 of a retention clamp 131 to lift the clamp from the holder. The torque arm support ring 56 is in its actuated position with the torque arm 25 firmly held in the notches. For installation of new samples or test surfaces, the operation is repeated in reverse.

Figure 8:
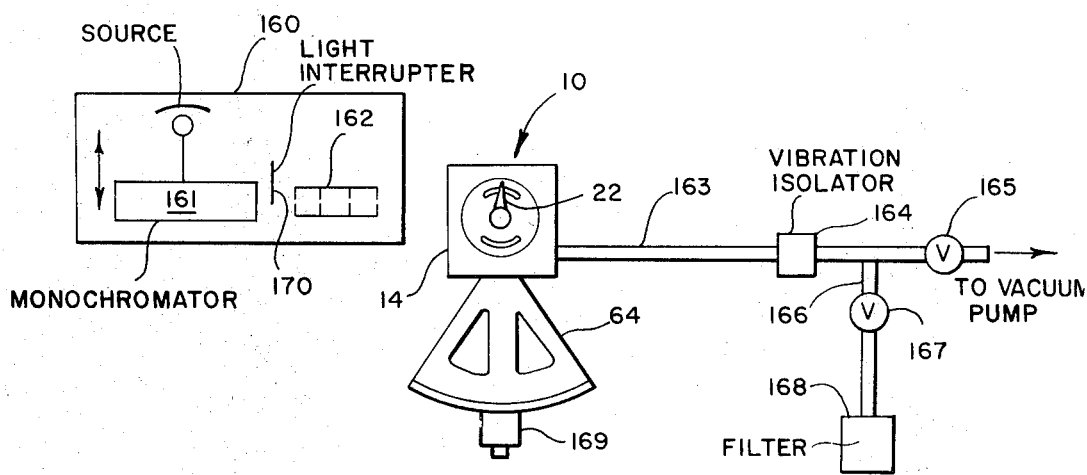
FIG. 8 is a diagrammatic view of a set-up for measurements of optical properties of a specimen.

FIG. 8 illustrates one possibe set-up for measuring radiation pressure or reflectance. Any suitable laboratory source 160 may be utilized which includes a conventional monochromator 161 for transferring photon energy at the proper frequency. The apparatus is positioned so that the monochhromatic beam may be passed through a collimating tube 162 and directed through the optical irradiation ports of the inner and outer shell onto the test samples.

The interior of test apparatus 10 is evacuated by connecting connector 62 to a high-vacuum pump through conduit 163, vibration isolator 164 and isolation valve 165. Venting is provided through conduit 166, vent valve 167, and filter 168.

Prior to making actual surface test measurements the following procedure is followed: The intensity of radiation at the test sample location is established through use of a calibrated detector in lieu of the surface to be tests. The intensity of the monochromatic beam is measured and the area of the test sample illuminated versus angle of the torque arm established. The effective moment arm of the illuminated area is also established and the total reflectance of the samples evaluated on an integrating reflectometer. Only after these calculations are available are the test surfaces installed on the torque arm and the arm checked for static balance.

The inner shell 12 is rotated until torque arm 25 is at the desired testing angle, $\theta_0$. Position indicator 22 is then set or aligned at the same angle as the torque arm and sliding position indicator 27 adjusted to mark the initial position. A vacuum is drawn on the apparatus and the position checked.

During the testing operation, the same background radiation is maintained throughout the test. All interior surfaces and surfaces which can reflect light into the interior of the apparatus are coated so as to minimize the effects of reflective energy, and, since the device is symmetric about the central axis, torque producing effects of background radiation are minimized. Also, refraction problems are minimized through the circular optical viewing windows which ensure that light rays always intercept the windows at right angles.

Static balance of torque arm 25 is determined through the viewing through port 72. The external, detachable, optical scale reflection attachment 64 with light source 169 permits optical measurement of torque arm deflection. The optical indicator is particularly advantageous for establishing equilibrium conditions and for measuring small deflections.

Having completed the alignment procedure, the energy beam from monochromator 161 is slowly uncovered by moving the light interrupter 170 so as to minimize starting transient effects on the test surfaces 136. Steady state operation is monitored by observation of the light beam directed from light source 169 on mirror 80 and reflected on scale 66. On achieving steady state operation, the sighting indicator on position indicator 26 is aligned with torque arm 25 or 124. This establishes a second position which is marked with another position indicator (not shown) slidable along scale 23. The angle between the second position, position 2, and the initial position, position 1, is noted as $\theta_0$, which defines the change in angle caused by the radiation pressure. The difference between corresponding position indicators on the scale 66 is equal to $2\theta_1$.

After marking the two positions, the inner ring torquing crank 21 is actuated and the inner shell 12 rotated until the torque arms are in their initial positions with respect to the outer shell 11. The optical reflection attachment 64 assures proper alignment when the light spot has returned to the point coincident with the original sliding position indicator marking position 1 on scale 66. Although the torque arm is now at start position $\theta_0$, the inner ring position indicator is at a new position, defining position 3. The angle between positions 1 and 3 is designated at $\theta_2$. This new position is marked with another sliding indicator on scale 23 and the total angle $\phi$ through which the torsion filament has turned at time, $t=0$, is equal to the sum of $\theta_1+\theta_2$.

$$\phi \text{ total } (t=0) = \theta_1 + \theta_2 \qquad (a)$$

$\phi$ total is the angle used to calculate radiation pressure at initial time, $t=0$. Recorded data consists of time and the angles on each scale for each position. The angle $\theta_2$ will either decrease or increase with time depending on the characteristics of the material being irradiated. Torquing crank 21 is used to return the torque arm to position $\theta_0$ and a new position $x$ for succeeding time intervals $(t=x)$ is recorded. Changes in positions at succeeding time intervals or after stated angular deviations of the torque arm system from the desired angle $\theta_0$ thus provide data to calculate radiation pressure. Duration of the test for determining reflectance and degradation values of samples may be varied. For example, if the test specimen is a paint whose deterioration with time is to be observed under simulated solar radiation, a typical test may run 3000 hours.

By definition, radiation pressure is that force per unit area exerted normal to a surface due to a change in momentum of the incident photon flux. Knowing the torque, the effective moment arm and the area of the sample illuminated, the radiation pressure can be calculated. For a double suspension system, the torque can be calculated from the relation:

$$\phi = TL/2JG \qquad (b)$$

where:

$J$ = polar moment of inertia of a wire of circular cross section
$L$ = length of the filament being torqued in one half of the suspension system with upper and lower filaments of equal length.
$T$ = torque
$G$ = modulus of elasticity in sheer.

In an orthogonal coordinate system, forces may exist along the X, Y, and Z axes, depending upon directional relations between the radiation source and test surface and depending upon surface properties; however, only the force along the Z axis normal to the sample will cause a torquing action about the center of suspension. Thus, the external torque may be defined by the equation $$T_{ext} = P_z \cdot R_{eff} \cdot A_{eff} \qquad (c)$$

where $T_{ext}$ = external torque
$P_z$ = force normal to the sample surface per unit area (pressure)
$R_{eff}$ = effective radius of illuminated area of sample
$A_{eff}$ = effective illuminated area The force per unit area, $P_z$, is given by the expression, $$P_z = \frac{G_0}{C}\left[\cos\theta_0^2 + \cos\frac{\theta_0}{\pi}\sum_{\theta=0}^{\theta=w'}\rho_T(\theta')\cos^2\theta'\Delta w'\right] \qquad (d)$$

where:

$G_0$ is the actual intensity of illumination and C is the velocity of light in a vacuum The general equation of motion of the torsion system is represented by the differential equation of motion for a single degree of freedom torsional system where $\theta$ is used instead of $\phi$:

$$\ddot{\theta} + \frac{C}{I_z}\dot{\theta}\frac{K}{I_z}\theta = T_{ext} \qquad (e)$$

where:

$I_z$ = moment of inertia of the torque arm system about the Z axis
$\theta$ = angular displacement
$C$ = torsional dampening coefficient
$K$ = torsional stiffness
$T_{ext}$ = external torque
$\dot{\theta} = d\theta/dt$
$\ddot{\theta} = d^2\theta/dt^2$ Combining the equations for torque and deflection the value of $P_z$ can be calculated to numerically obtain in conjunction with Equation $d$ a normal reflection component.

The change in radiation pressure and torque with time ($t$) of irradiation is equal to the difference between calculations for $\theta(t_1)$ and $\theta(t_2)$. Values of $\theta$ can be obtained from Equations $a$ and $b$.

Thus, the present invention provides an efficient mechanical-optical apparatus for continuous monitoring of surface degradation of materials undergoing photon bombardment. The system is sensitive to the forces exerted by photons and the deflections caused by such forces can be measured either mechanically, optically, or electrically. The changes in the forces with time are continuously monitored to provide a continuous indication as the material is degraded by photon bombardment.

It should be apparent that while the invention has been described with respect to a specific embodiment using two identical sample materials carried on the opposite ends of a torque arm, other variations will suggest themselves to those skilled in the art. For example, dual external radiation sources with identical sample materials in a pure torque system may be used. Alternatively, a comparison mode system may be employed wherein two opposed materials are irradiated from independent sources to compare a sample to a reference material. Also, single or multiple external radiation sources may be used to evaluate partially transparent materials.

Various other modifications will readily suggest themselves to those skilled in the art. For example, mechanical readout of reflection angles may be provided through change in resistance of the suspension filament or an electrical readout may be used by using a filament which is an electrical conductor and monitoring the change in resistance of the conductor. Therefore, it is intended by the appended claims to cover all such modifications which fall within the true spirit and scope of the invention.

We claim:

1. Apparatus for monitoring surface degradation and surface reflectance of a sample material undergoing photon bombardment comprising an outer shell, an inner shell, means for rotatably supporting said inner shell relative to said outer shell, means within said inner shell for supporting the sample material for rotation about the axis of said inner shell in response to photon bombardment of the sample from a source of radiation of a desired frequency and intensity, at least one irradiation port in each of said shells, said irradiation ports having a major axis aligned in a common plane and being disposed such that the sample material may be exposed to the source of radiation through said ports and indicator means fixed with respect to the outer shell for indicating the degree of rotation of the sample material about the axis of the inner shell.

2. Apparatus for monitoring surface degradation and surface reflectance as set forth in claim 1 wherein said means within said inner shell for supporting the sample material comprises a torsion wire affixed at opposite ends to said inner shell, a torque arm supported normal to said wire and with its axis in the common plane, said indicator means includes a scale affixed to the outer shell and further including a pointer fixed with respect to said inner shell and cooperatively associated with said scale to prove a visible indication of the degree of rotation of the sample material.

3. Apparatus for monitoring surface degradation and surface reflectance of a sample material as set forth in claim 1 wherein said means within said inner shell for supporting the sample material comprises a torsion wire affixed at opposite ends to said inner shell, a mirror supported for rotation with said wire and a torque arm supported normal to said wire and with its axis in the common plane, said indicator means includes a scale fixed to said outer shell, a light source mounted to said scale, said light source adapted to be energized for directing a beam of light onto said mirror for reflection onto the scale to provide an optical indication of the degree of rotation of the sample material.

4. Apparatus for monitoring surface degradation and surface reflectance of a sample material as set forth in claim 1 further including a torquing crank mechanically coupled to said inner shell for rotating the inner shell independently of the means within said inner shell for supporting the sample material.

5. Apparatus for monitoring surface degradation and surface reflectance of a sample material as set forth in claim 4 wherein said outer shell is a sealed chamber, said outer shell having a cover plate with at least one access opening therein, a removable viewing window positioned on said cover plate, said inner shell having a cover plate with at least one access opening therein adapted to be coaxially aligned with the access opening of said outer shell cover plate for removal of the sample material through said openings.

6. Apparatus as set forth in claim 5 wherein said means within said inner shell for supporting the sample material comprises a torsion suspension system including a torsion wire affixed at opposite ends to said inner shell, a suspension tube through which said torsion wire passes having retainer caps at opposite ends, each cap having a deformable grommet for retaining the extension wire, a pair of torque arms, each torque arm being supported at one end to the suspension tube, and a sample holder affixed to each of the other ends of the torque arms for supporting test samples.

7. Apparatus for monitoring surface degradation and surface reflectance of a sample material as set forth in claim 6 further including a sample material retention clamp for mounting each sample and said sample holder having an open channel for slidingly receiving the retention clamp.

8. Apparatus set forth in claim 7 wherein said retention clamps each include at least one access hole adapted to receive a gripping tool for positioning the clamp with respect to the channel of the holder from the exterior of the apparatus through said access ports.

9. Apparatus for monitoring surface degradation and surface reflectance of a sample material undergoing photon bombardment comprising an outer shell forming a sealed chamber, means for evacuating said chamber, an inner shell, means for rotatably supporting said inner shell relative to outer shell, said inner shell comprising a base, a cylindrical wall and a cover member, a pair of access openings in said cover member, a pair of diametrically opposed irradiation ports in said wall member, a pair of vertically spaced ring supports along the axis of said inner shell, a torque arm suspension system supported to said ring supports including a torsion wire and a torque arm disposed normal thereto and means at opposite ends of said torque arm for supporting the sample material, said outer shell comprising a base, a cover, a rectangular housing supported to said base and having a pair of ports including windows transparent to photon irradiation, said ports adapted to be aligned with the irradiation ports of the inner shell to permit photon bombardment of the sample from an external source and a transparent ring viewing window adjacent said rectangular housing for enabling transmission of inward and outward light rays, an optical reflection system including an external light source, a mirror supported for rotation with the torsion wire, said external light source being supported on an optical scale fixed with respect to the rectangular housing for transmitting inward light rays through said ring window to said mirror whereby outward light rays are reflected through said ring window for viewing on the scale to provide an indication of the degree of rotation of the torsion wire about the axis of the inner shell in response to forces generated by photon bombardment of the sample material from the external source and markers slidably supported on said optical scale for marking the degree of rotation of said torsion wire.

10. Apparatus as set forth in claim 9 further including a torquing crank fixed to said outer shell and mechanically coupled to said inner shell for rotating the inner shell independently of the torque arm suspension system and mechanical indicating means for indicating the degree of rotation of the inner shell including a scale on the outer shell, a pointer fixed with respect to said inner shell and rotatable therewith, said pointer having one end terminating adjacent said scale and a plurality of markers slidingly positioned along said scale for selectively marking positions therealong.

References Cited

UNITED STATES PATENTS 182,172  9/1876  Crookes.

ROY LAKE, Primary Examiner

O. B. CHEW II, Assistant Examiner

U.S. Cl. X.R.

356—216

PO-1050
(5/69)

UNITED STATES PATENT OFFICE
CERTIFICATE OF CORRECTION

Patent No. 3,531,210          Dated October 2, 1970

Inventor(s) Firouz Shahrokhi et al.

It is certified that error appears in the above-identified patent and that said Letters Patent are hereby corrected as shown below:

Col. 5, line 44, "interally" should be --internally--.
    Col. 6, line 69, "monochhromatic" should be --monochromatic--.
    Col. 7, line 49, "$\theta_0$" should be --$\theta_1$--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents